(12) United States Patent
Kleiner

(10) Patent No.: US 7,740,428 B2
(45) Date of Patent: Jun. 22, 2010

(54) ROTOR

(75) Inventor: Gilbert Kleiner, Inzigkofen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 11/644,775

(22) Filed: Dec. 22, 2006

(65) Prior Publication Data

US 2007/0103026 A1 May 10, 2007

Related U.S. Application Data

(63) Continuation of application No. PCT/DE2005/000441, filed on Mar. 11, 2005.

(30) Foreign Application Priority Data

Jun. 25, 2004 (DE) .................. 20 2004 010 078 U

(51) Int. Cl.
B23C 5/26 (2006.01)
(52) U.S. Cl. ..................... 409/232; 407/32; 407/46
(58) Field of Classification Search ..... 408/238–239 A, 408/231, 226; 409/232, 234; 407/31, 32, 407/42, 40, 46; B26C 5/26; B23C 5/26
See application file for complete search history.

(56) References Cited

U.S. PATENT DOCUMENTS

| | | | | |
|---|---|---|---|---|
| 1,337,313 A | * | 4/1920 | Groene | 409/234 |
| 2,325,746 A | * | 8/1943 | Curtis | 407/32 |
| 2,431,581 A | | 11/1947 | Owen et al. | |
| 2,840,887 A | * | 7/1958 | Donnelly | 407/36 |
| 2,989,800 A | | 6/1961 | Howard | |
| 4,506,715 A | | 3/1985 | Blackwell | |
| 4,993,890 A | | 2/1991 | Tukala et al. | |
| 5,493,940 A | * | 2/1996 | Klein | 83/343 |
| 5,605,420 A | * | 2/1997 | Feldsine | 407/32 |
| 5,716,167 A | | 2/1998 | Siddle et al. | |
| 6,488,456 B1 | * | 12/2002 | Satran et al. | 409/234 |
| 6,511,265 B1 | * | 1/2003 | Mirchandani et al. | 407/53 |
| 7,037,050 B1 | | 5/2006 | Maier et al. | |
| 2007/0103026 A1 | | 5/2007 | Kleiner | |
| 2007/0104545 A1 | | 5/2007 | Matheis | |

FOREIGN PATENT DOCUMENTS

| | | |
|---|---|---|
| DE | 1 076 467 | 2/1960 |
| DE | 1 143 082 | 1/1963 |
| DE | 27 56 819 | 7/1978 |

(Continued)

OTHER PUBLICATIONS

Walter, "News I+Nov. 1997", Erganzung zum Gesamtkatalog 1996, Printed in Germany, 394 098 292 (Aug. 1997), 6 pages.

*Primary Examiner*—Daniel W Howell
(74) *Attorney, Agent, or Firm*—Burr & Brown

(57) ABSTRACT

A rotor, used particularly in a rotating tool for machining workpieces, includes a rotor base body with locations, which are formed on the periphery thereof in an interspaced manner and which are suited for fitting the rotor with functional elements. The rotor base body includes a first, radially outer base body element and a second, radially inner base body element. When the rotor is not rotating, a jointing pressure prevails along an encircling joining line, which is formed between both base body elements. The second, radially inner base body element has a higher modulus of elasticity than that of the first, radially outer base body element.

20 Claims, 1 Drawing Sheet

FOREIGN PATENT DOCUMENTS

| | | |
|---|---|---|
| DE | 38 20 295 | 5/1989 |
| DE | 4419026 A1 * | 12/1995 |
| DE | 197 16 818 | 11/1998 |
| DE | 198 00 440 | 7/1999 |
| DE | 199 63 328 | 7/2000 |
| DE | 20 2004 007 8 | 10/2004 |
| DE | 20 2004 010 075 U1 | 11/2004 |
| DE | 20 2004 010 078 U1 | 11/2004 |
| DE | 103 43 673 A1 | 5/2005 |
| DE | 102005 013 61 | 1/2006 |
| EP | 0 347 397 | 12/1989 |
| EP | 0 830 229 | 3/1998 |
| GB | 1 566 927 | 5/1980 |
| JP | 57-071717 | 5/1982 |
| JP | 02071915 A * | 3/1990 |
| JP | 06008046 A * | 1/1994 |
| JP | 07-024619 | 1/1995 |
| JP | 08001425 A * | 1/1996 |
| JP | 11019839 A * | 1/1999 |
| SU | 1194601 | 11/1985 |
| WO | 2006/000171 | 1/2006 |

* cited by examiner

ROTOR

CROSS-REFERENCE TO RELATED APPLICATIONS

This application is a continuation of International Application PCT/DE2005/000441, filed Mar. 11, 2005, the entirety of which is incorporated herein by reference. This application claims the benefit of German Application No. 20 2004 010 078.9, filed Jun. 25, 2004, the entirety of which is incorporated herein by reference.

FIELD OF THE INVENTION

This invention relates to a rotor for rotating tools used to machine a workpiece.

BACKGROUND OF THE INVENTION

In rotors that rotate at high speed, a radial expansion of the rotor base body that occurs due to the centrifugal force acting represents a limit for the permissible operating speed. Where the geometric dimensions (inside, outside diameter, etc.) are structurally predetermined, this expansion depends on the rigidity of the component parts of the materials used for their manufacture.

In addition to the expansion, the amount of imbalance and the inertial forces placed on a rotor must also be minimised. Light metal materials are therefore frequently used in practice for the base body into which functional elements are inserted.

This is a well-known design principle in tool engineering and is used as a basis, for example, in the manufacture of HSC (High Speed Cutting) milling tools. Thus, use is made in the light metal base body of steel cassettes to which cutters of a hard metal, a PCD (polycrystalline diamonds), etc. are fastened. The inertial forces and imbalance forces can therefore be kept low. However, the overall deformation of the system depends to a large degree on the natural deformation of the light metal base body. The components assembled onto the base body are, in addition to their natural deformation, additionally displaced by the amount of the base body expansion. The overall deformation due to operating conditions is therefore composed of the sum of the base body deformation plus the component deformation.

SUMMARY OF THE INVENTION

The object of this invention is to further develop a rotor of the type already mentioned to ensure that greater reliability and accuracy are achieved when machining workpieces. The present invention achieves this object.

The invention relates to a rotor, particularly a rotating tool for machining workpieces while cutting, comprising a rotor base body with locations which are formed on the periphery thereof in an interspaced manner and which are designed for fitting the rotor with functional elements. The invention is characterised in that the rotor base body includes a first, radially outer base body element and a second, radially inner base body element. The first and second base body elements are arranged relative to each other so that a jointing pressure prevails along an encircling joint line when the rotor is not rotating. Additionally, the radially inner base body element has a higher modulus of elasticity than the radially outer base body element.

The invention results in a rotor in a composite structure of materials with different moduli of elasticity. The preferably annular body is inserted in the rotor base body exerting a stiffening characteristic upon it with its modulus of elasticity that is higher than that of the base body.

The structure of such a rotor is based on the knowledge that a body produced from two parts with different moduli of elasticity has deformation properties extending beyond a certain load range, which properties are far more favorable, in terms of load, than the deformation properties of an integral body if a jointing pressure prevails in a joint line designed so that it encircles the two base body elements.

For rotating bodies, it has been discovered that in this connection, a device with a first radially inner, and a second radially outer base body element (e.g. for a milling head), the radially inner base body element, must have the higher modulus of elasticity (i.e. the lower deformation characteristics). What is important here is that such a jointing pressure must prevail in the joint line between the inner base body element, which need not, however, necessarily be of integral design, and the outer base body element with the material produced from a lower modulus of elasticity than the former element, that both radial and tangential transmissions of force between these two base body elements are possible. Both base body elements, therefore, advantageously interact so that a jointing pressure prevails throughout the entire operating speed range of the rotating body, but at least over a partial range.

Because of the mechanical conditions that necessarily prevail in the joint line, the radial stresses and the tangential expansions of the outer and inner base body element on the joint diameter DF of the joining line have the same value. The tangential stress that determines the expansion of the outer base body element comprises not only a subordinate radial stress portion, at different moduli of elasticity, but essentially the tangential stress of the inner portion that is reduced by the factor modulus of elasticity (outer base body element) to modulus of elasticity (inner base body element) Ea/Ei, and is always below the value of an integral comparative rotor where the jointing pressure is adequate and the geometrical dimensions suitable.

The jointing pressure between the two base body elements can be generated, for example, by a compressed joint. Screwed joints or dimensional interferences in the region of the joining line are available as further possibilities for generating a jointing pressure in the joining line.

A transmission of forces distributed throughout the circumferential region of the joining line gives rise to a uniformly supporting action of the base body element with the higher modulus of elasticity on the base body element with the lower modulus of elasticity.

To achieve these improved deformation characteristics of the rotor base body, there should be a connection, under jointing pressure, between the two base body elements, at least over a partial section of the axial extension of the rotor. Advantageously, this is at least the region in which the maximum loading moments act on the rotor when in use.

This may, for example, be the region of the axial extension of the rotor, which overlaps with the region in which the functional elements are arranged interspaced on its circumference. In the case of a milling head this would, for example, be the receiving region for the cutting plate holders.

In order to minimise the masses of the base body to be accelerated, given suitable dimensions, it may be advantageous to provide the inner base body element with an annular design. Since the rotor is advantageously also of a round design in its outer circumference, this results, at least in the region in which both base body elements are joined together axially one above the other, in at least a two-part annular structure with different diameters for the individual functional elements. Advantageously, the ratio of a diameter (DF)

on which the annular joining line runs to an outside diameter (DA) of the radially outer base body element lies approximately in the range between 0.3 and 0.9. Although a knowledge of the improved operating characteristics is also useful within a wider range of ratios, this range has proved particularly advantageous based on the group of parameters to be considered in the course of extensive numerical and analytical investigations.

Here it was also established that the wall thickness of the inner basic body element is advantageously at least 5% of the outside diameter of the radially outer basic body element.

For special applications it may be advantageous for the radially inner base body element to be designed as part of a tool location or as a coupling element for adapting to a machine tool spindle. This may have the advantage, for example, that the rotor is formed from a resistant material extending its operating time in the region in which it is itself securely clamped.

The radially inner basic body element may, as an additional advantageous characteristic, have fastening elements for fixing the functional element and/or may be suitable for receiving such fastening elements. Such fastening elements may, for example, be designed as thrust bearings, screw threads, cramps, hooks and the like. The thrust bearings may have bores or slots for radial passage through the inner ring. However, fixing may also be carried out laterally on the inner ring by means of cramps, hooks and the like, particularly in cooperation with further means for fastening the functional elements. It is advantageous here for at least the greater part of the fastening forces to be absorbed by the basic body element with the higher modulus of elasticity. Such a fixing may have an advantageous effect, particularly at high speeds with speed ranges of 15,000 revolutions per minute to 20,000 revolutions per minute and more, as are now current in industrial production.

BRIEF DESCRIPTION OF THE DRAWINGS

An exemplary embodiment of the invention is explained further in the attached drawing with an indication of further advantages and details. The attached figures show a possible embodiment of this invention.

DETAILED DESCRIPTION OF THE INVENTION

Figure 1:
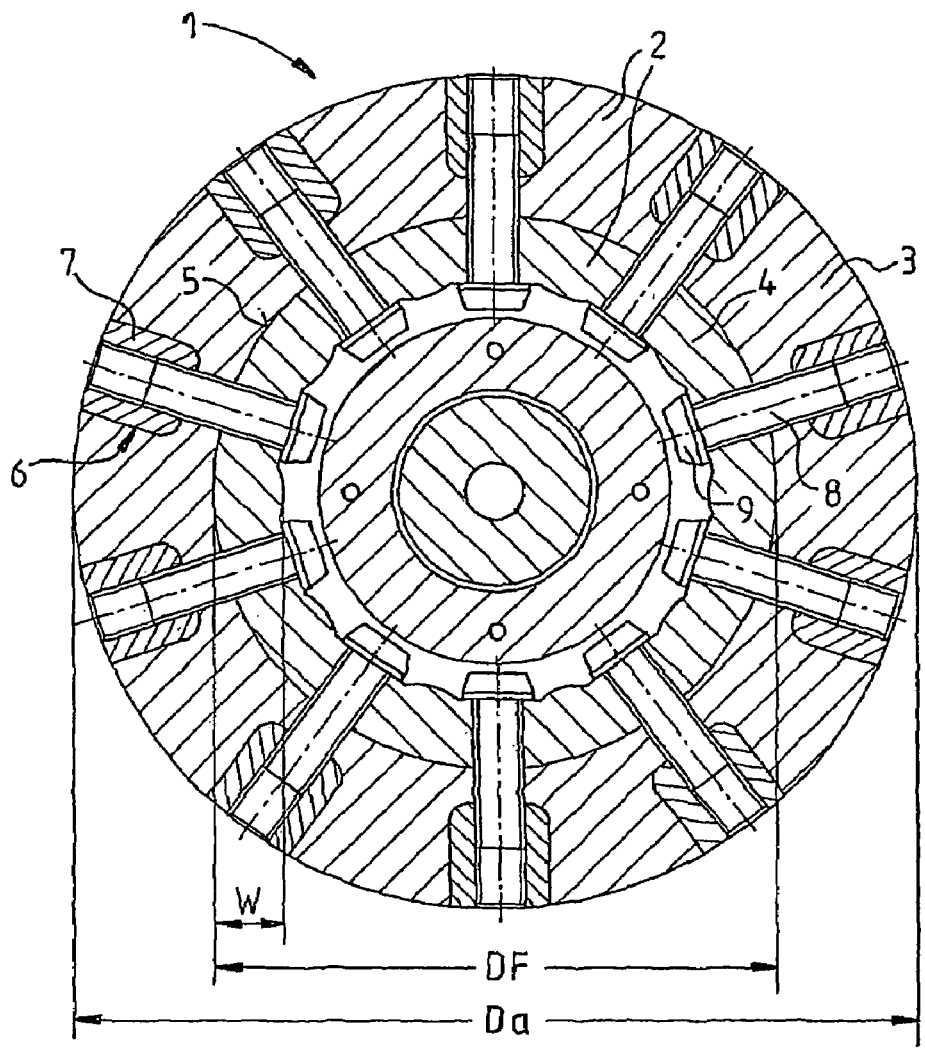
FIG. 1 shows a front view of a rotor according to the invention in the form of a milling head.

In the front view of rotor 1 shown in FIG. 1, rotor base body 2 is formed by two annular base body elements 3, 4, which lie adjacent to each other on the encircling joining line 5 having the jointing pressure according to the invention.

The required jointing pressure is introduced at least via fixing points or regions in the rotor base body interspaced circumferentially on the joining line. This may preferably be the case in this example in the region around fastening elements 8, by means of which elements functional elements 7 are fastened radially inwards with head 9 on base body element 4. However, the jointing pressure according to the invention preferably acts throughout the circumferential region of joining line 5 between the two basic body elements 3, 4.

Figure 2:
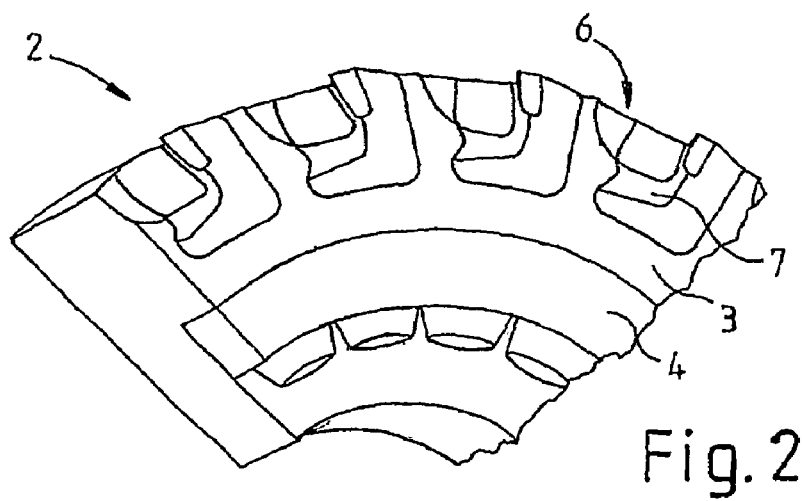
FIG. 2 shows the oblique view of a partial section from FIG. 1.

FIG. 2 shows an example in which the two base body elements 3, 4 are connected at least over a partial section of the axial extension of rotor 1. Here the second base body element 4 is combined with the first base body element in the same axial extension of rotor 1 in which the radially outer functional elements 7 interspaced on the circumference are arranged in their locations 6. Since the maximum deformations occur during operation because of the higher density of functional elements 7 than base body element 3 in this region, the arrangement of the second base body element 4 in this axial section of rotor base body 2 is most effective.

In FIG. 1 the component dimensions which are used for determining the ratios of diameter DF of annular joining line 5 to the outside diameter Da of the outer annular base body element, and for determining wall thickness W of inner annular base body element 4, are denoted by the arrows with the references W, DF and Da.

This embodiment according to FIGS. 1 and 2 is only one exemplary solution which can obviously be replaced by other wholly equivalent embodiments without departing from the essential concept of the invention.

The invention claimed is:

1. A rotor for machining workpieces comprising a rotor base body with locations interspaced along its circumference, the locations being designed for fitting the rotor with functional elements, the rotor base body further comprising:
    a first radially outer base body element; and
    a second radially inner base body element being, cross-section, a hollow profile of high rigidity and low weight,
        wherein the first base body element and the second base body element are arranged relative to each other so that a jointing pressure prevails along an encircling joining line formed between the first base body element and the second base body element, when the rotor is not rotating,
        wherein the second base body element has a higher modulus of elasticity than the first base body element, and
        wherein the second base body element comprises a plurality of fastening elements.

2. The rotor according to claim 1, wherein the fastening elements are screw connections.

3. The rotor according to claim 1, wherein the first base body element and the second base body element are connected to each other by a compressed connection.

4. The rotor according to claim 1, wherein the first base body element and the second base body element are connected to each other by screwing means.

5. The rotor according to claim 1, wherein the first base body element and the second base body element are connected to each other by at least one partial section of an axial extension of the rotor, the axial extension having the functional elements interspaced around its circumference.

6. The rotor according to claim 1, wherein the second base body element is of an annular design.

7. The rotor according to claim 1, wherein the ratio of a diameter, on which the joining line runs, to an outside diameter of the first base body element lies in the range between 0.3 and 0.9.

8. The rotor according to claim 7, wherein a wall thickness of the second base body element is at least 5% of the outside diameter of the first base body element.

9. The rotor according to claim 1, wherein the second base body element is formed as part of a tool location or as a coupling element for adapting to a machine tool spindle.

10. The rotor according to claim 1, wherein the second base body element is a simple bushing or tube.

11. The rotor according to claim 1, wherein the second base body element is part of a drive shaft.

12. A rotor for machining workpieces comprising a rotor base body with locations interspaced along its circumference, the locations being designed for fitting the rotor with functional elements, the rotor base body further comprising:

a first radially outer base body element; and a second radially inner base body element being, in cross-section, a hollow profile of high rigidity and low weight, wherein the first base body element and the second base body element are arranged relative to each other so that a jointing pressure prevails along an encircling joining line formed between the first base body element and the second base body element, when the rotor is not rotating, wherein the second base body element has a higher modulus of elasticity than the first base body element, and wherein the second base body element comprises receiving means for receiving a plurality of fastening elements.

13. The rotor according to claim 1, wherein the first base body element comprises receiving means for receiving a plurality of fastening elements.

14. The rotor according to claim 1, wherein the rotor further comprises functional elements attached to the fastening elements.

15. The rotor according to claim 12, wherein the first base body element and the second base body element are connected to each other by screwing means.

16. The rotor according to claim 12, wherein the first base body element and the second base body element are connected to each other by at least one partial section of an axial extension of the rotor, the axial extension having the functional elements interspaced around its circumference.

17. The rotor according to claim 14, wherein the first base body element and the second base body element are connected to each other by a compressed connection.

18. The rotor according to claim 14, wherein the first base body element and the second base body element are connected to each other by screwing means.

19. The rotor according to claim 14, wherein the first base body element and the second base body element are connected to each other by at least one partial section of an axial extension of the rotor, the axial extension having the functional elements interspaced around its circumference.

20. The rotor according to claim 12, wherein the first base body element and the second base body element are connected to each other by a compressed connection.

* * * * *

UNITED STATES PATENT AND TRADEMARK OFFICE
CERTIFICATE OF CORRECTION

PATENT NO. : 7,740,428 B2  Page 1 of 1
APPLICATION NO. : 11/644775
DATED : June 22, 2010
INVENTOR(S) : Gilbert Kleiner It is certified that error appears in the above-identified patent and that said Letters Patent is hereby corrected as shown below:

Title Page, Foreign Application Priority Data
*Please change*: "20 2004 010 078 U" to --20 2004 010 078.9--

Title Page, Foreign Patent Documents, page 2
*Please change*: "DE 20 2004 007 8  10/2004" to --DE 20 2004 007 811 10/2004--
*Please change*: "DE 102005 013 61 1/2006" to --DE 102005 013 616 1/2006--

Column 4
*Line 24*: please add --in-- before "cross-"

Signed and Sealed this

Seventh Day of September, 2010

David J. Kappos
*Director of the United States Patent and Trademark Office*